United States Patent [19]

Sloan, Jr. et al.

[11] Patent Number: 4,740,347
[45] Date of Patent: Apr. 26, 1988

[54] METHOD OF ALIGNING AND FIXING VALVE COMPONENTS DURING VALVE ASSEMBLY

[75] Inventors: Paul H. Sloan, Jr., Granger, Ind.; Danny F. Quick, Blytheville, Ark.; James M. Brown, Osceola, Ark.; Van W. O'Keefe, Blytheville, Ark.

[73] Assignee: Nibco, Inc., Elkhart, Ind.

[21] Appl. No.: 618,570

[22] Filed: Jun. 8, 1984

[51] Int. Cl.$^4$ .................. B29C 45/14; F16K 1/22
[52] U.S. Cl. .................. 264/262; 29/157.1 R; 29/455 R; 29/460; 29/469; 29/527.2; 29/527.4; 264/263; 264/277; 264/279; 264/328.2; 425/DIG. 47
[58] Field of Search ............. 264/261, 263, 275, 277, 264/242, 262, 279, 328.2; 249/144, 146; 425/DIG. 47; 29/527.1, 527.2, 527.4, 157.1 R, 455 R, 460, 469, DIG. 26; 251/305, 306

[56] References Cited

U.S. PATENT DOCUMENTS

| | | | |
|---|---|---|---|
| 3,271,845 | 9/1966 | Breher | 264/242 X |
| 3,540,314 | 11/1970 | Howard | 264/261 X |
| 3,603,341 | 9/1971 | Scaramucci | 264/275 X |
| 3,642,247 | 2/1972 | Scaramucci | 251/148 |
| 3,675,888 | 7/1972 | Scaramucci | 249/57 |
| 3,754,317 | 8/1973 | Taylor | 264/262 X |
| 3,771,764 | 11/1973 | Miyauchi | 249/96 |
| 3,940,108 | 2/1976 | Edwards | 264/275 |
| 4,038,358 | 7/1977 | Wrasman | 264/263 |
| 4,200,514 | 4/1980 | Schaale | 264/262 |
| 4,213,932 | 7/1980 | Young | 249/144 |
| 4,223,430 | 9/1980 | Sherlaw | 264/263 |

FOREIGN PATENT DOCUMENTS 1106881 3/1968 United Kingdom ........... 264/269

Primary Examiner—Jeffery Thurlow
Assistant Examiner—Leo B. Tentoni
Attorney, Agent, or Firm—Barnes & Thornburg

[57] ABSTRACT

The invention provides a means whereby a body such as that of a butterfly valve can be prepared with minimal machining. The manufacture of a butterfly valve is described in which the stem openings for the valve are left in their as-cast condition, the stem bushings inserted, aligned with a stem replica and then permanently locked in aligned position by filling the voids between the bushings and the walls of their openings with the same elastomeric compound from which the valve seat is molded. The compound, after curing or setting, being of such thin wall section that for all practical purposes it is a rigid material.

11 Claims, 6 Drawing Sheets

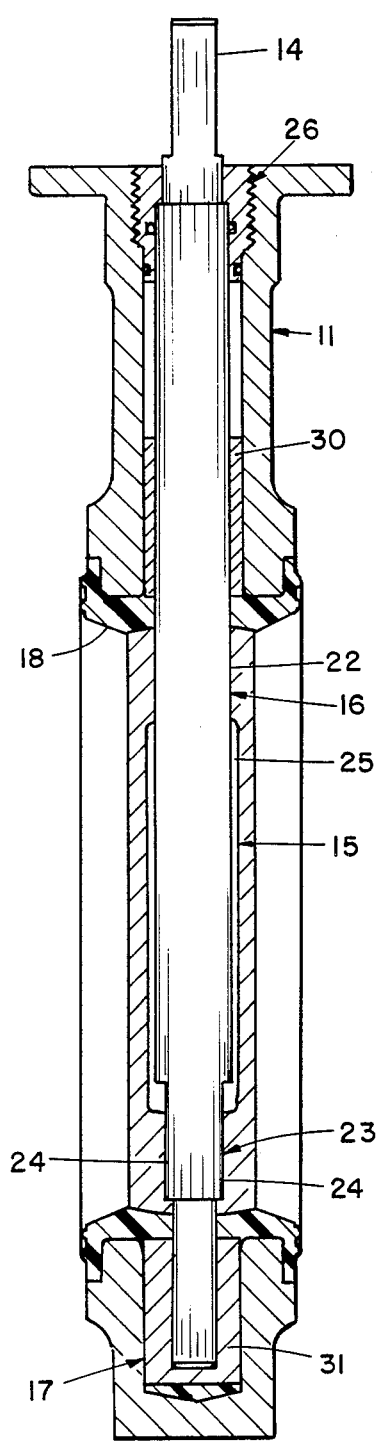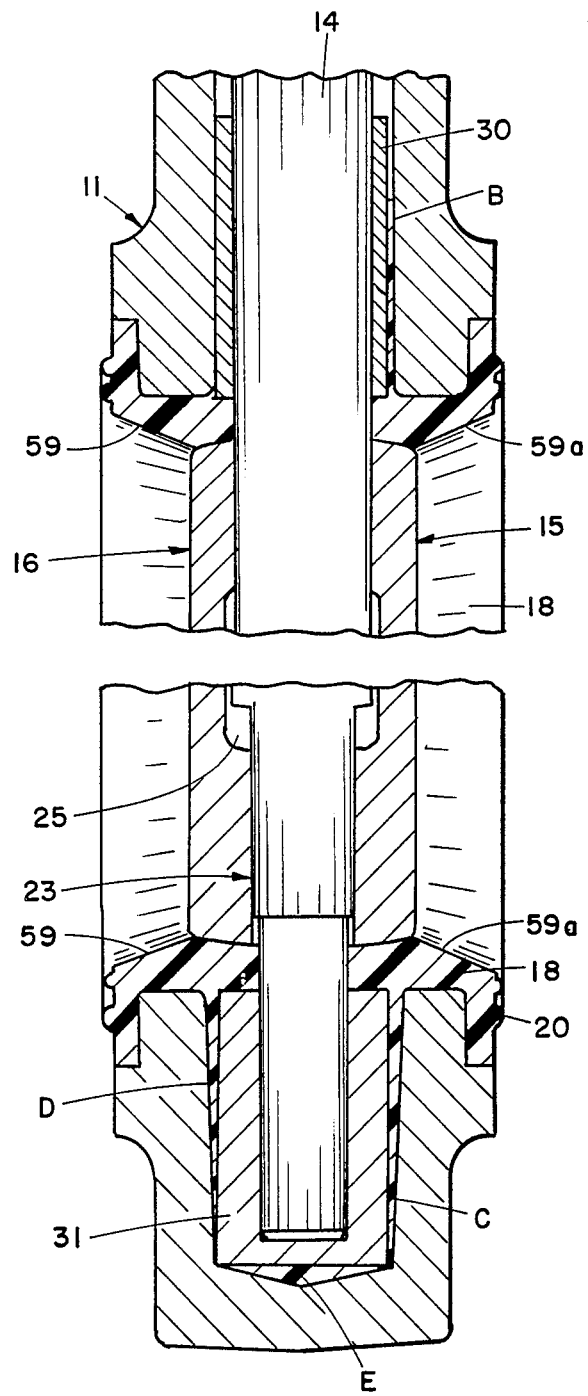
FIG 2
FIG 8

METHOD OF ALIGNING AND FIXING VALVE COMPONENTS DURING VALVE ASSEMBLY

FIELD OF THE INVENTION

This invention relates to valves or more particularly to butterfly valves. It relates to both the design of the valve and to the method of its manufacture.

BACKGROUND OF THE INVENTION

Butterfly valves are particularly desirable in a number of applications because of their rapid operation and their relatively high flow capacity. However, to be completely leakproof, especially at high pressures, the valve member must be very accurately positioned with respect to the seal against which it seats. This has required close tolerance machining of not only the valve itself but also of the stem or shaft which mounts the valve and the bearings mounting the shaft. Because these valve housings are sand cast they cannot be cast to the accuracy required for effective operation using conventional valve designs and manufacturing methods.

Because of the access problems inherent in butterfly valve design the tooling for performing the necessary machining is expensive. The fact that machining the valve stem opening necessitates extending the tool from one side of the valve body to the other creates serious difficulty in maintaining accurate alignment, an essential for effective valve operation. If any amount of cut has to be eccentric, this will, unless great care is exercised, cause the tool to wander, resulting in misalignment. Even with expensive and properly operated tooling it is extremely difficulty to consistently maintain accuracy within the tolerances necessary to assure leakproof, high pressure operation of the valves. Further, the machining is very expensive not only because it is demanding of equipment but it is slow and requires very skilled operators. Particularly is this true in the boring and reaming of the valve body to receive the valve stem.

Another problem is that of the high torque required to operate the conventional butterfly valve. If the valve is not equipped with bearings for the valve stem, even the best machining normally results in a valve having excessive torque due to friction between the valve stem and the housing. The addition of bearings normally reduces this high torque, but only to a degree, because of the great difficulty of maintaining highly accurate alignment.

Another factor contributing to high closing torque characteristic of conventional butterfly valves is the amount of compression of the seal by the vane or valve member. The primary area in which leakage is experienced is in the area adjacent the stem. Therefore, a high degree of compression is required in that area. However, further away from the axis of rotation of the valve less seal compression is required to control leakage. However, if the valve and the seal are both circular the amount of compression remains constant entirely around the valve. This contributes substantially to the high torque because of the effect of the moment arm for that portion of the valve which is substantially spaced from the axis of the stem.

BRIEF DESCRIPTION OF THE INVENTION

The invention eliminates substantially all of the machining and totally eliminates that part of the machining requiring a high degree of accuracy and alignment. The invention provides means for accurately aligning the valve stem bearings by mounting them on a precisely machined replica of the valve and stem and placing them in the unmachined or only rough machined openings in the housing and while so supported in precise alignment on the replica stem locking them in place by injection molding rubber around them. In this manner the bearings are free to float with respect to the stem openings in the valve housing and thus maintain their precise alignment with the stem irrespective of inaccuracies of the stem openings existing in the rough casting either before or after an initial rough machining. The tolerances which can be routinely maintained in sand casting normally do not require any machining when the teachings of this invention are used. Once the injected rubber has cured, the bearings are locked in place and the replica is removed.

The replica not only establishes the alignment of the bearings, it also shapes and defines the inside surface of the seal against which the valve member of the finished valve will seat. By making this replica slightly spheroidal in shape with the greater axis at a right angle to the axis of the stem, the amount of interference and thus of seal compression can be reduced where it is not required. This is a further factor materially contributing to a reduction in the torque necessary to operate the valve.

BRIEF DESCRIPTION OF THE DRAWINGS

FIG. 2 is a central sectional view taken along the plane II—II of FIG. 1;

FIG. 8 is an enlarged fragmentary view of the valve seat;

DESCRIPTION OF THE PREFERRED EMBODIMENT

Figure 1:
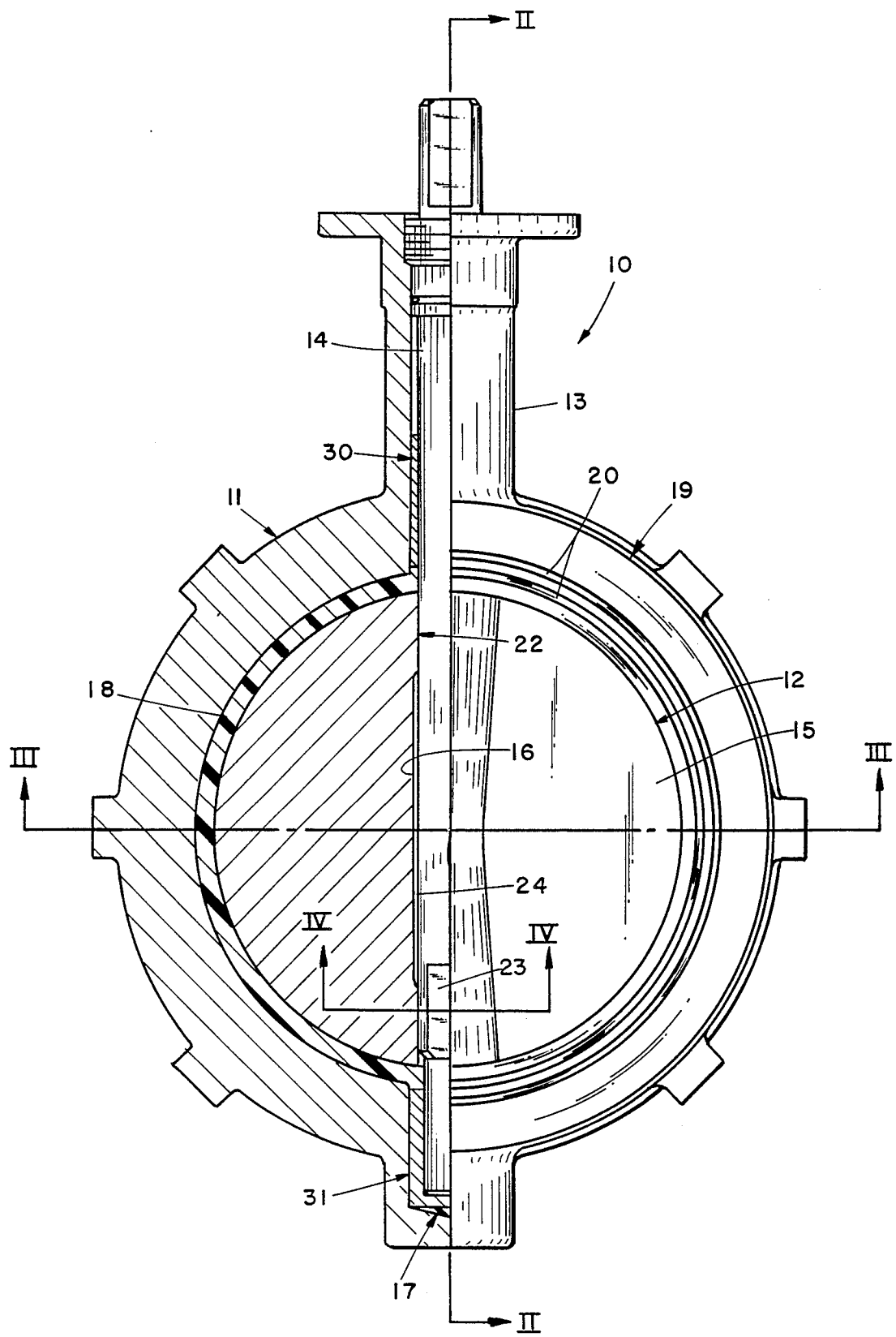
FIG. 1 is an end elevation view of a valve incorporating this invention with one half of the valve centrally sectioned.

Referring to FIG. 1, the valve 10 has a housing or body 11 cast of suitable material such as ductile iron. The body is annular having a central passage 12 for fluids. It has a neck extension 13 through which the stem 14 is inserted to mount and actuate the valve member or disc 15. The stem 14 is seated in a stem opening 16 extending diametrically through the disc. Its end opposite from the neck is seated in the blind socket 17 in housing. The stem 14 and disc 15 are rotatable from the closed position illustrated in FIGS. 1 and 2 to an open position turned 90°. The disc 15, in closed position, seats against and forms a seal with the valve seat 18. The valve seat is molded in place within the body 10 of a suitable material such as rubber and bonded to the body. At each end of the valve, the valve seat has a radially outwardly extending lip 19 overlapping the end face of the valve body and surrounding the fluid passage 12. A portion of the lips, in the form of annular beads 20, project axially beyond the end faces of the valve to provide a compressible seal with the ends of the pipes between which the valve will be mounted and clamped when installed.

Figure 3:
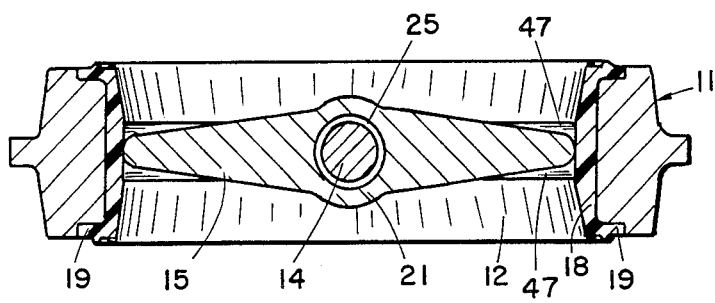
FIG. 3 is a sectional view taken along the plane III—III of FIG. 1.
Figure 4:
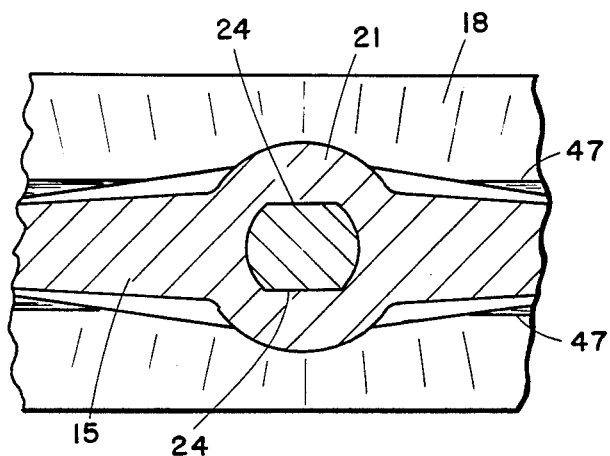
FIG. 4 is an enlarged, fragmentary sectional view taken along the plane IV—IV of FIG. 1.

The valve disc is circular and is supported by the stem 14 which extends diametrically through the disc. The stem 14 is seated in the opening 16 through the valve disc 15 which is centered in an enlarged central boss 21 (FIGS. 3 and 4). Adjacent the neck extension 13 the central opening is circular as at 22 (FIG. 2) and seats relatively closely about the stem 14. Adjacent the blind socket 17 the opening has parallel flat areas forming a non-circular portion 23 which engages the flat surfaces 2 on the stem 14 (FIG. 4). The engagement between these flat areas provides an interference fit (FIGS. 1 and 4) by which rotational motion of the stem 14 is transmitted to the disc 15. Between the portion 22 and the non-circular surfaces 23 the opening 16 is circular and larger than the stem providing clearance 25 between the stem and disc (FIGS. 1 and 3).

Figure 6:
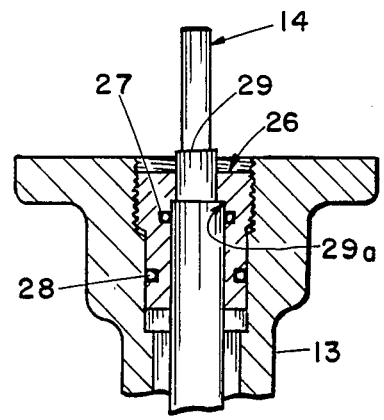
FIG. 6 is an enlarged fragmentary sectional view of the seal for the stem.

The top of the neck 13 is closed by a threaded bushing 26 which centers and supports the end of the stem (FIGS. 2 and 6). The stem extends beyond the bushing to provide means for attaching an actuator such a handle. The bushing has inner and outer O-ring seals 27 and 28, one engaging the stem and the other the housing (FIG. 6). The diameter of the stem 14 is reduced as it passes upwardly through the bushing 26, forming a shoulder 29 which engages the step 29a in the bushing to retain the stem against accidental blow-out.

All of the preceding design and structure is conventional in the butterfly valve art and is state-of-the-art practice. In the valve 10 illustrated in FIG. 1 it will be seen that the stem 14 where it enters the neck 13 from the fluid opening 12 is surrounded by a bushing 30. Also the end of the stem seated in the blind socket 17 is surrounded by a bushing 31. Preferably, the bottom end of the bushing 31 is closed making the seat for the stem 14 a blind socket. While many butterfly valves are constructed with such bushings to reduce torque, in some smaller valves they are omitted. When the conventional practices for machining the openings for these bushings are utilized, the reduction in the torque required to operate the valve is frequently quite minimal because of alignment problems.

Figure 5:
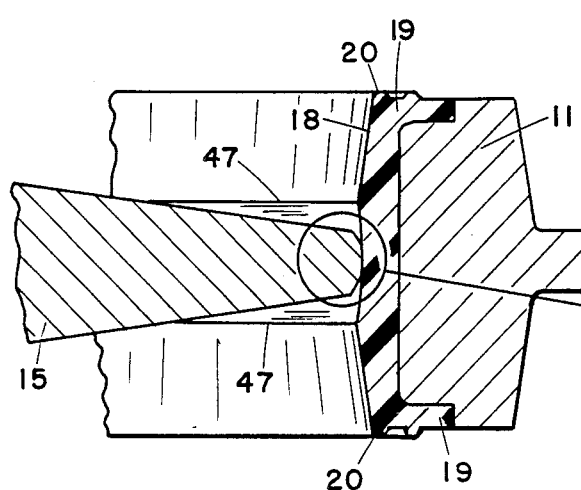
FIGS. 5 and 5a are enlarged fragmentary sectional view of the engagement of the valve disc with the valve seat.
Figure 5A:
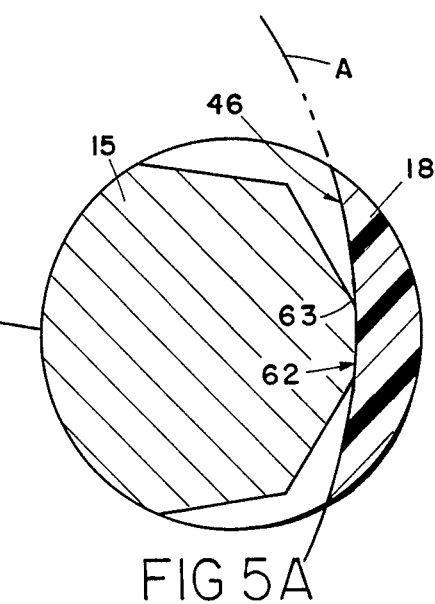
Figure 10:
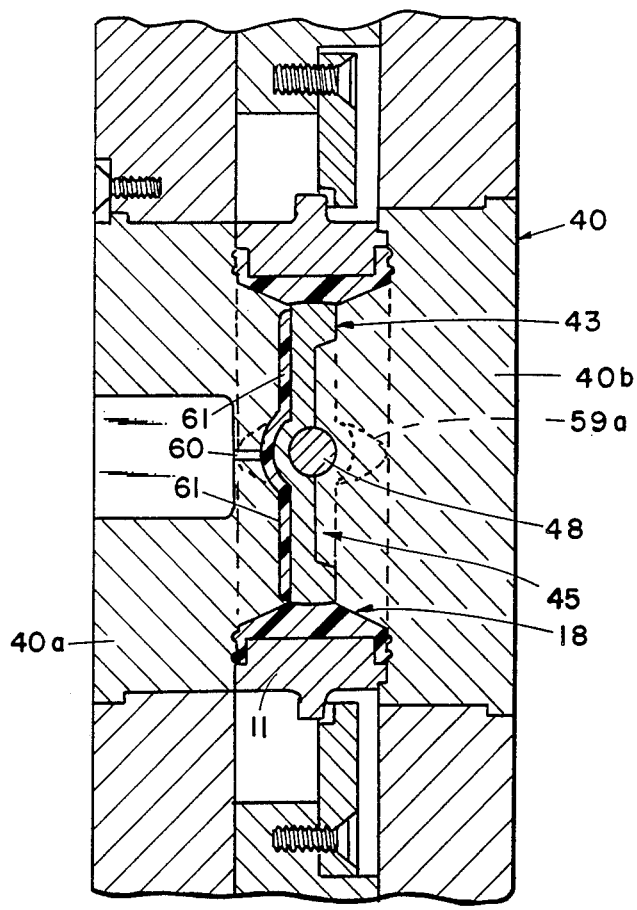
FIG. 10 is a sectional view of the mold in closed condition for the seal taken along the plane X—X of FIG. 15.
Figures 11, 12:
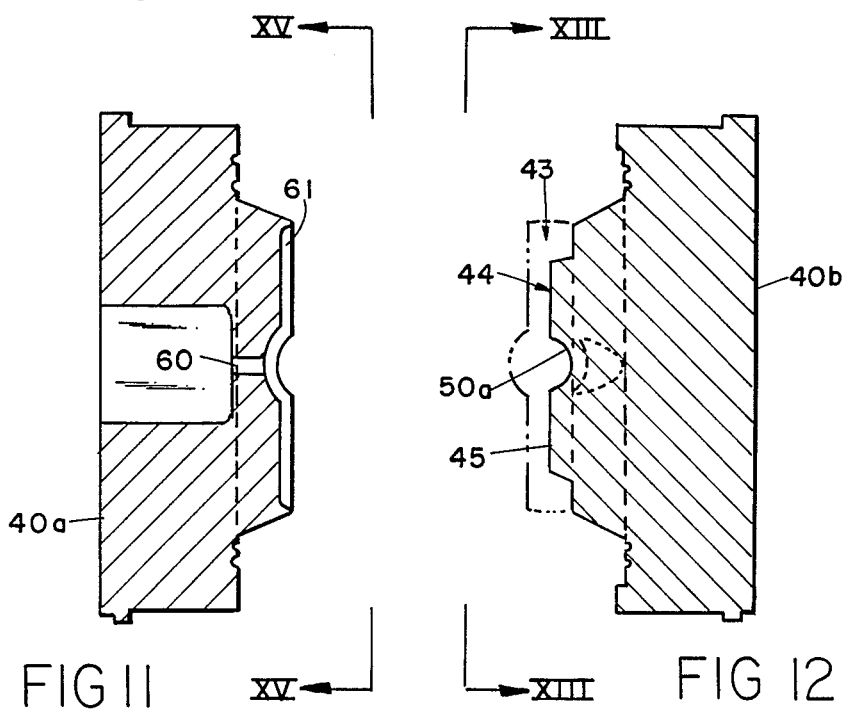
FIG. 11 is a sectional view of one half of the mold taken along the plane X—X of FIG. 9, showing the disc replica in phantom.
FIG. 12 is a sectional view similar to FIG. 11 showing the other half of the mold.
Figure 7:
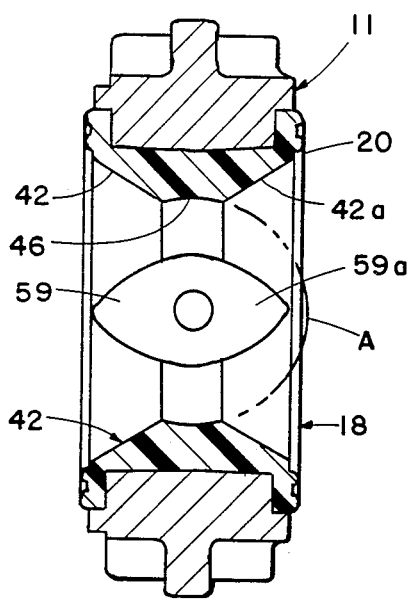
FIG. 7 is a sectional view of the valve and valve seat taken along the same plane as FIG. 3 but with the valve removed.
Figure 9:
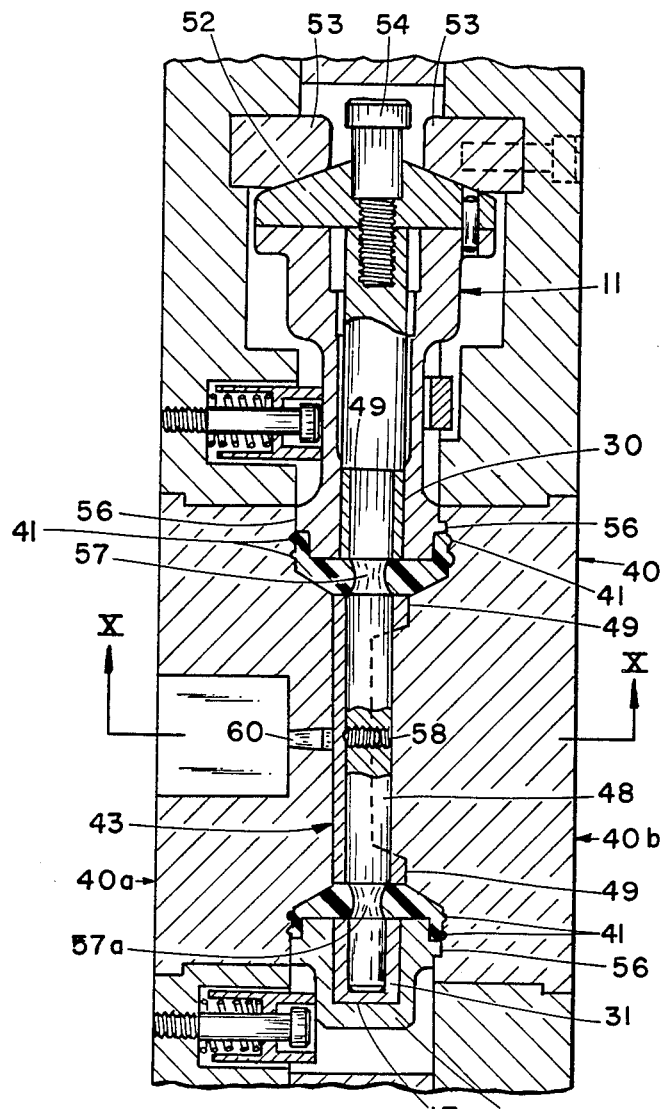
FIG. 9 is a sectional view of the mold in closed condition for the seal taken along the same plane as FIG. 2.
Figure 14:
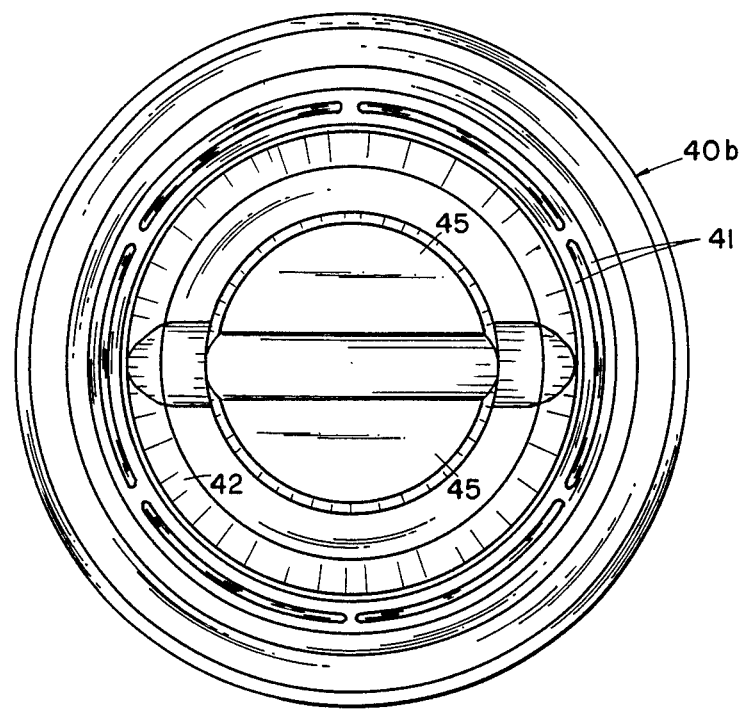
FIG. 14 is a view of the inside face of one half of the mold taken along the plane XIII—XIII of FIG. 12.

In the practice of this invention the valve housing or body 11 is placed in a mold 40 having a pair of halves 40a and 40b which clamp the body 11 between them (FIGS. 9 and 10). The mold halves are clamped tightly against the end faces of the body and have grooves 41 in them to form the beads 20 (FIG. 9). The mold has radially inwardly and convergently inclined annular surfaces 42 and 42a to form the axial outer portions of the seat. The central or valve seating portion of the seat is shaped by a disc replica 43 which is seated in the fluid passageway and is clamped between the mold halves 40a and 40b (FIG. 10). The disc replica 43 is recessed in one face (FIG. 16) creating a cavity 44 into which a mating boss 45 on mold half 40b seats to hold the valve replica properly located within the valve body 11 (FIGS. 10 and 12). The cavity and boss have inclined walls to accurately center the replica. The replica 43 is axially thicker than the valve creating a shallow, annular channel 46 for seating the sealing edge of the disc (FIGS. 3, 5 and 9). The channel is arcuate in cross section and constitutes a narrow, annular segment of a sphere centered about the central axis of the fluid passage 12 as indicated by the phantom line A in FIGS. 5a and 7. However, the fluid passage through the valve seat is not truly circular but rather is slightly spheroidal, having a slightly greater diameter at right angles to the axis of the stem 14 for purposes which will be explained subsequently. For example, if the diameter of the fluid passage along the axis of the stem 14 is 2.00 inches, the diameter of the fluid passage at right angles to the stem will be 2.07 inches. The axial width of the channel 46 is determined by its intersection with the inclined surfaces 42 and 42a which intersection forms a pair of circular, parallel apexes 47 (FIGS. 3-5).

Figure 16:
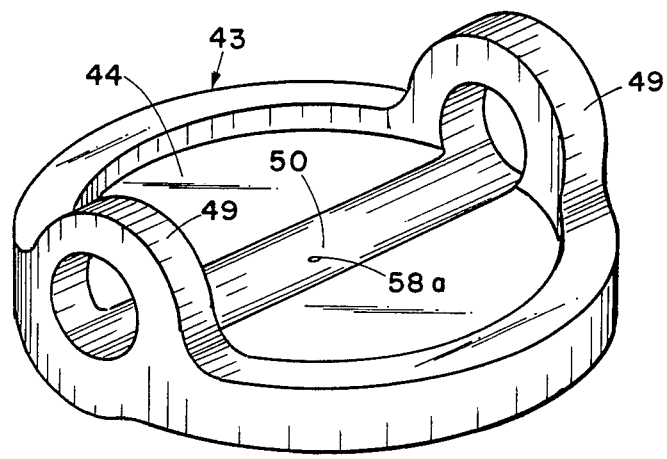
FIG. 16 is an oblique view of the disc replica.
Figure 13:
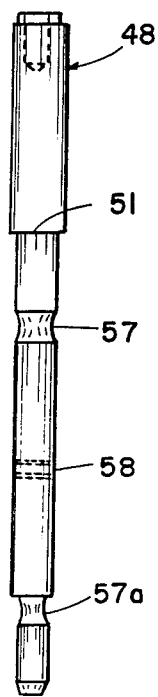
FIG. 13 is a view of the stem replica used with the mold.

To prepare the valve for molding the valve seat to the valve body 11, the bushings 30 and 31, stem replica 48 and disc replica 43 are first assembled. The bushings 30 and 31 are first placed in their openings and the stem replica inserted through the neck 13. This is done while the valve body is horizontal so that the sleeve bushings will not be biased to slide out of their openings. This is necessary since the bushings are not wedged against the walls of their openings but rather have a limited degree of freedom to float in their openings. As the stem replica is inserted the disc replica 43 is positioned to pass the stem replica through it. In doing this the stem replica is passed through the collars 49s of the disc replica 43 which enclose each end of the stem channel 50 (FIGS. 9 and 16). As the stem replica is assembled to the mold it automatically positions and aligns the bushings 30 and 31. The stem replica has a shoulder 51 which restrains outward axial movement of the neck bushing 30 under the pressure exerted against it by the elastomeric compound during molding (FIGS. 9 and 13).

The stem replica has a spring biased detent 58 which seats in a pocket 58a in the disc replica (FIG. 9). The detent holds the disc replica from rotating around the stem replica while the assembly is being placed in the mold. It also properly locates the disc replica axially of the stem replica.

The valve body and replica assembly are seated against the mold half 40b using the boss 45 and the channel 50a (FIG. 12) for the stem replica to accurately position it. Once the assembly has been properly seated, the other mold half 40a is positioned and the mold is closed. The open end of the neck is closed by a cap 52 which holds the stem replica against accidental discharge during molding. The cap 52, in turn, is secured by wedges 53. A cap screw 54 provides means to grasp and withdraw the stem replica when the molding process is complete.

The stem replica 48 is accurately machined, especially in those portions of the replica that seat the bushings 30 and 31. In the areas seating the bushings the stem replica is preferably machined to a very close tolerance to substantially eliminate differences in bushing position from valve to valve. This is not a costly procedure since the surfaces of the replica are accessible and the replica, once machined satisfactorily, is used for the manufacture of many valves. It will also be recognized that this invention can be practiced with a lower bushing 31 which has no closed end.

It will also be observed in FIGS. 9 and 13 that the stem replica, where it passes through the area where the valve seat is to be formed around it is necked down at 57 and 57a. This results in a valve seat shape which exerts additional sealing pressure against the valve stem, an area prone to leakage in butterfly valves.

The preparation of the body 11 prior to being clamped in the mold 40 is minimal. Except to machine smooth and parallel those of the end faces which must seat tightly against the mold such as at 56 (FIG. 9) and to bore and thread the outer end of the neck 13 to receive the closure bushing 26 (FIG. 2) no other machining is necessary. The neck and socket bushings 30 and 31 are accurately positioned by the stem replica 48 and, prior to molding of the valve seat, are not secured to the housing. They have a clearance fit with the valve body at least sufficient to permit them to be seated in their respective openings in the body 11 as dictated by the stem replica irrespective of the variations in opening size and alignment from casting to casting which are normally found in unmachined sand castings. Thus, using this invention, the bushing position and alignment is entirely controlled by the stem replica 48 rather than the accuracy of the machining performed on the valve body 11 as has heretofore always been the case. Thus, perfect alignment is always achieved and costly machining has also been eliminated.

Before the valve body and replicas are assembled the outer surfaces of the bushings, the walls of the openings into which they are inserted along with all surfaces of the valve body which will be contacted by the elastomeric compound are cleaned with a suitable solvent such as trichloroethane and then coated with a suitable rubber to metal adhesive such as that marketed by Hughson Chemicals, Lord Corporation under the trademark "Chemlok 252". Also before the valve body replica assembly is placed in the mold it is heated to approximately 300° F. to assure adequate flow of the elastomeric compound.

Once the disc replica 43 and stem replica 48 have been locked in place in the closed mold, a rubber or a rubber-like elastomeric compound of suitable composition is injected into the mold under sufficient heat and pressure to fill the cavity in the mold. The composition will vary for several reasons including the expected operating temperatures of the valve and the characteristics of the fluid to be passed through the valve. A suitable elastomer for this purpose is an elastomer-gum sold by E. I. DuPont de Nemoirs & Co. under the trademark "Nordel". The elastomer compound when cured should have a hardness of 70 Shore A.

Figure 15:
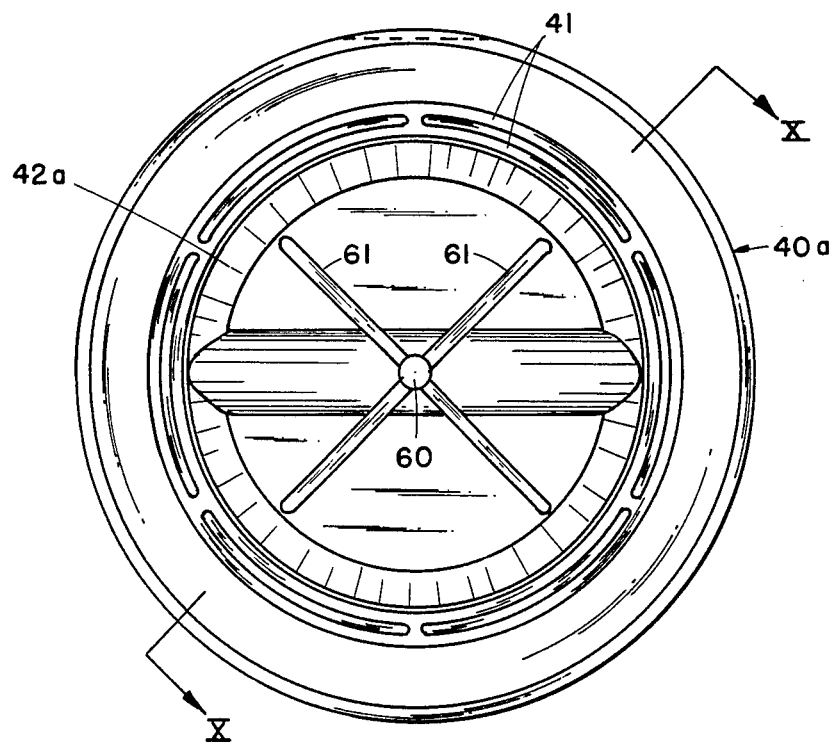
FIG. 15 is a view of the other half of the mold taken along the plane XV—XV of FIG. 11.

The injection is done under very high pressure through the gate 60 (FIGS. 9 and 15) and is distributed through the channels 61 (FIGS. 9 and 10). The injected elastomeric compound not only is caused to produce the valve seat 18 in the conventional way, it also is caused to flow around the sleeve bushings 30 and 31 to fill the gap between the bushings and the walls of the openings in which they are seated (FIG. 8). These thin sections of injected compound are indicated at B, C and D in FIG. 8. In fact, as indicated at E in FIG. 8 the rubber or elastomeric material may even fill the void between the end of the sleeve bushing 31 and the bottom of the socket 17. It will be recognized that the thickness of these injected sections has been exaggerated in FIG. 8 to make them more readily visible. It will also be recognized that the thickness of these sections will vary from valve to valve due to normal variations in the body castings. During injection of the elastomeric material the sleeve bushings are held in accurate alignment by the stem replica 48. The sleeve bushings, being mounted on the stem replica 48 with even a closer fit than they may have with the valve stem when it is substituted for the stem replica, will be accurately aligned to receive the valve stem. Because the elastomeric compound will automatically seek these narrow voids and fill them, there is no necessity for machining either the neck opening or the blind socket since the rubber will compensate and permanently fill any gap or void due to misalignment and other inaccuracies normally characteristic of the cast housing 11. In effect, the stem replica with the attached bushings is allowed to float in the rubber and will automatically establish a position where the various forces acting on it equalize. Thus, the bearings, stem replica and disc replica will become stabilized in a position of minimum resistance to subsequent operation of the valve disc after its installation. The cost of the finished valve is materially reduced by the elimination of the costly machining operation and rejects resulting from faulty machining. The thin layers B, C, D and E of elastomeric material which are caused to squeeze between the sleeves and the body are, for all practical purposes, inelastic since there is not enough thickness to permit flexing.

After the elastomeric material has cured the mold is opened, the stem replica removed and the disc replica rotated and then pushed out of the valves ready for reuse to make another valve. Once the replicas have been removed, the actual valve disc 15 can be inserted in the fluid passage with the stem opening aligned with the sleeve bearings 30 and 31. The insertion of the valve disc is facilitated by the bosses 59 and 59a molded into the valve seat at the stem openings (FIG. 8). These bosses are created by the fact that the valve replica 48 is thicker in the area of the valve stem replica changing the slope of the valve seat faces 42 and 42a. The faces have a different inclination at the stem opening (FIGS. 2 and 8) than throughout the rest of the valve seat (FIG. 5). Once the valve disc 15 is positioned and aligned with the stem openings the valve stem 14 can then be inserted through the neck and pushed down through the valve disc to seat in the blind socket 17. It will be noted from FIGS. 1 and 2 that the valve stem 14 does not have the necking of the stem replica and thus has to further compress the valve seat at these points.

The stem opening 16 in the disc, like the valve body, is also not machined except to remove rough burrs and the like except in the area of the key non-circular portion 23. This portion of the stem opening is machined to provide a suitable fit with the stem to reduce the amount of lapse which will be experienced when the valve is operated. This, however, need not be machined to close tolerances, once again eliminating the necessity for costly tooling and the services of highly skilled machinists.

The circumferential edge 62 of the disc is machined to make it truly circular. It is also machined to break or round the edges 63 (FIG. 5a) at the transition between the center portion and the inclined edge portions of the disc. This eliminates any rough, sharp or irregular areas which might cause wear on the elastomer of the valve seat. This machining is relatively simple and inexpensive by comparison with the machining which has heretofore been necessary to properly seat the stem and assembled the stem and disc.

As pointed out earlier, the disc replica 43 is sightly spheroidal in shape with its maximum diameter at a right angle to the stem. Thus the fluid passage through the molded seat normal to the stem is slightly wider than the passage parallel to the stem. This permits the disc to more tightly compress the valve seat in the area adjacent the stem. This is desirable because this is the area where valve leakage most often occurs. Since the disc is machined to accurate circularity of the spheroidal shape of the valve seat reduces the degree of valve seat compression occurring at 90° to the stem where less compression is needed to prevent leakage. The reduction in compression and thus resistance to rotation at a right angle to the axis of the stem significantly reduces the amount of torque necessary to operate the valve since the load at that point is applied at the end of a moment arm representing the radius of the valve. As the diameter of the valve increases, the force necessary to operate it because of resistance at this point increases geometrically. Thus, introduing spheroidal design to the valve seat is a major contribution to reduction of operating torque. Further, this is a factor which can be easily applied in fabrication since the amount of variation from a true spherical shape is proportional to the change in fluid passage diameter. It is comparatively simple and inexpensive to provide the spheroidal shape in the valve seat mold compared to machining the valve disc to a non-circular shape.

Making the cross sectional shape of the channel 46 a segment of a true circle also contributes to the functional characteristics of the valve. This reduces the resistance to opening and closing of the disc. It also eliminates the necessity for exactly positioning the closed valve disc to effect a leakproof closure. Thus, there can be an acceptable degree of lapse in the rotational relationship between the valve disc and the stem. This contributes to the fact that close tolerance machining to effect a fit between these components is no longer necessary. This is also important when the operator is not in a position to physically observe whether or not he has effectively closed the valve.

The invention provides a butterfly valve which can be manufactured at a substantially reduced cost while incorporating a number of significant functional improvements. While a preferred embodiment of the invention in both product and method of manufacture have been described it will be recognized that various modifications can be made without departing from the principles of the invention. Such modifications are to be considered as included in the hereinafter appended claims unless these claims, by their language expressly state otherwise.

We claim:

1. The method of making a butterfly valve having a cast annular body defining a central axial fluid passageway and a tubular neck portion and a diametrically positioned blind socket for receiving an end of the valve stem of the assembled valve, the steps which include: placing a first tubular bushing in the neck adjacent the fluid passageway and placing a second tubular bushing in the socket, providing a valve disc replica having diametric valve shaft openings, placing said valve disc replica in the passageway with its shaft openings aligned with said neck and socket bushings, inserting a valve stem replica through the stem openings in the valve disc replica and both bushings and into the socket, clamping the valve body and assembled replicas in a mold having a cavity of a size and shape to form an annular valve seat between the valve disc replica and the valve body and extending axially through the housing, injecting an elastomeric compound into the cavity under heat and pressure sufficient to cause the composition to fill the cavity and to flow between said bushings and the walls of the openings in which they are located while the bushings are held in alignment by said valve stem replica, curing said composition, and removing the valve stem and the valve disc replica such that said bushings remain fixed in alignment.

2. The method of making a butterfly valve described in claim 1 wherein the openings into which the bushings are placed are in an as-cast condition.

3. The method of making a butterfly valve as described in claim 1 wherein the valve disc replica has an axial thickness equal to a substantial portion of the axial length of the fluid passageway of the housing and by the shape of the circumferential surface of the replica forming a sealing surface which in the axial direction of the fluid passageway is a segment of a true circle.

4. The method of making butterfly valves as described in claim 3 wherein the thickness of the valve disc replica is in excess of one-third of the axial length of the fluid passageway.

5. The method of making a butterfly valve as described in claim 3 wherein the openings into which the bushings are placed are in an as-cast condition.

6. The method of making a butterfly valve having an annular metallic body defining a central axial fluid passageway and an intersecting tubular neck opening and a diametrically positioned blind socket for receiving the valve stem of the assembled valve, the steps which include: placing bushings loosely in the neck and socket openings, placing a valve disc replica having diametric stem openings in the fluid passageway, inserting a valve stem replica through both bushings and the valve disc replica, enclosing the body and attached replicas in a mold having a cavity of a size and shape to form an annular valve seat within and extending axially through the body, injecting a rubber-like composition into the cavity under heat and pressure sufficient to cause the composition to fill the cavity to form said valve seat and to flow between said bushings and the walls of the openings in which they are located while the bushings are held in alignment by said valve stem, curing said composition, and removing the valve stem and valve disc replicas such that said bushings remain fixed in alignment by said cured composition.

7. The method of installing and aligning valve stem bushings in the annular body of a butterfly valve, including the steps of providing diametrically opposed valve stem openings in said body on opposite sides of the opening through the body; placing bushings in the stem openings of a size slightly smaller than the openings whereby the bushings can move radially sufficiently to permit them to be aligned on a common axis, inserting a rod having a close fit with the bushings through the bushings to align them, injecting a thin layer of a elastomeric material under heat and pressure between the bushings and the walls of the stem opening while the bushings are held in alignment thereby stabilizing said bushings, curing the moldable material to secure the bushings to the walls of the stem openings and lock them rigidly in place.

8. In a method of making a butterfly valve having a cast annular housing defining a central axial fluid passageway and a tubular neck portion and a diametrically positioned blind socket for receiving the valve stem of the assembled valve, the steps which include: machining an annular portion of the opposite faces of said housing surrounding the ends of the fluid passageawy to make them smooth and parallel, placing a first tubular bushing in the neck adjacent the fluid passageway and placing a second tubular bushing in the socket, providing a valve disc replica having a diametric valve shaft opening, placing said valve disc replica in the passageway with its shaft opening aligned with said neck and socket bushings, inserting a valve stem replica through the stem opening in the valve disc replica and both bushings, clamping the valve body in a mold having a cavity of a size and shape to form an annular valve seat between the valve disc replica and the valve body and extending axially through the housing, injecting an elastomeric composition into the cavity under heat and pressure sufficient to cause the composition to fill the cavity and to flow between said bushings and the walls of the openings in which they are located while the bushings are held in alignment by said valve stem, curing said composition, removing the valve stem and the valve disc replica.

9. In the method of aligning and stabilizing bushings in a supporting body having aligned openings, the steps which include providing said openings with a diameter just enough oversize that the bushings may make small adjustments in their axial positions, inserting a close fitting common shaft through said bushings and causing them to align to the shaft, enclosing the bushings and adjacent portions of the body and shaft and injecting an elastomeric compound into the void areas between the bushings and the walls of the openings in which they are positioned under sufficient heat and pressure to substantially cause the compound to flow and to fill said voids thereby stabilizing said bushings, allowing said compound to cure to bond the bushings to said walls with a cured layer of the compound so thin that it is substantially a rigid substance.

10. A method of precisely positioning and stabilizing valve stem bushings, in a valve body having openings therein for receiving and supporting a plurality of stem bushings, comprising:

providing valve stem bushings having smaller dimensions than the dimensions of said openings and inserting said bushings into said openings;

providing an aligning means for connecting to said bushings while inserted within said openings and thereby precisely positioning said bushings in said openings with respect to the location of the valve stem of said valve body;

enclosing said bushings, said openings and at least a portion of said aligning means;

injecting an elastomeric compound into that enclosure to fill the spaces between said bushings and the walls of said openings thereby stabilizing said bushings; and curing said compound such that it is rigidly and permanently bonded between said bushing and the walls of said opening, thereby permanently positioning said bushing at the location established by said aligning means.

11. The method according to claim 1 wherein said butterfly valve is further assembled by insertion of a valve disc and a valve stem therein, said valve disc having a thinner sealing edge than said valve disc replica and said valve stem being necked outwardly by comparison with said valve stem replica at the valve seat so as to locally compress said valve seat.

* * * * *

UNITED STATES PATENT AND TRADEMARK OFFICE
CERTIFICATE OF CORRECTION

PATENT NO. : 4,740,347

DATED : April 26, 1988

INVENTOR(S) : Paul H. Sloan, Jr., et al.

It is certified that error appears in the above-identified patent and that said Letters Patent is hereby corrected as shown below:

In Column 2, line 13, please delete "an" and insert therefor -- any --.

In Column 2, line 42, please delete "view" and insert therefor -- views --.

In Column 3, line 35, please delete "2" and insert therefor -- 24 --.

In Column 4, line 47, please delete "49s" and insert therefor -- 49 --.

In Column 7, line 21, please delete "of".

In Column 9, line 15, please delete "passageawy" and insert therefor -- passageway --.

Signed and Sealed this

Eleventh Day of October, 1988

Attest:

DONALD J. QUIGG

*Attesting Officer*  *Commissioner of Patents and Trademarks*